Oct. 22, 1935.    C. W. SCHREIBER ET AL    2,017,992
TIMER
Filed Sept. 14, 1933    5 Sheets-Sheet 3
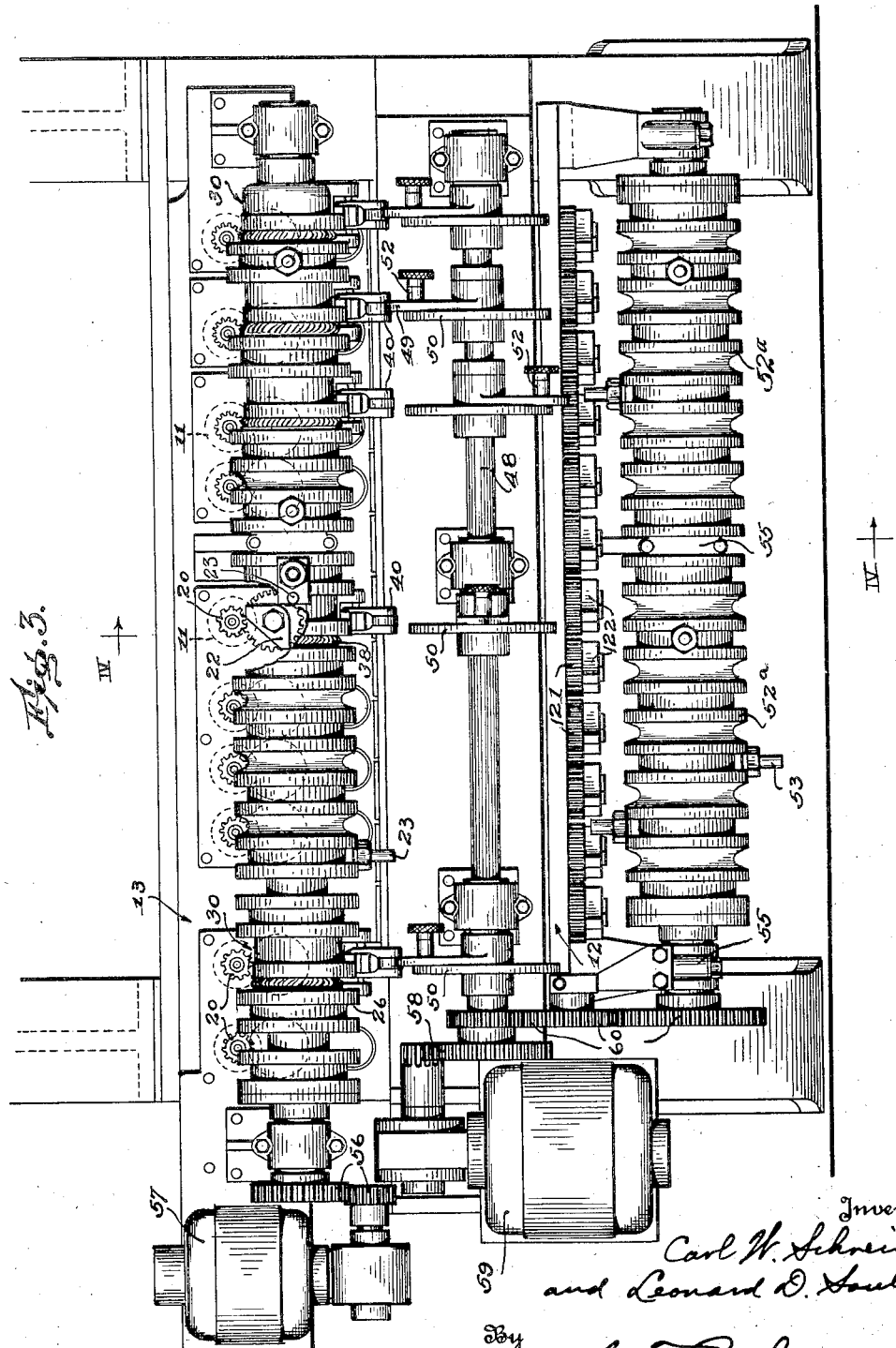

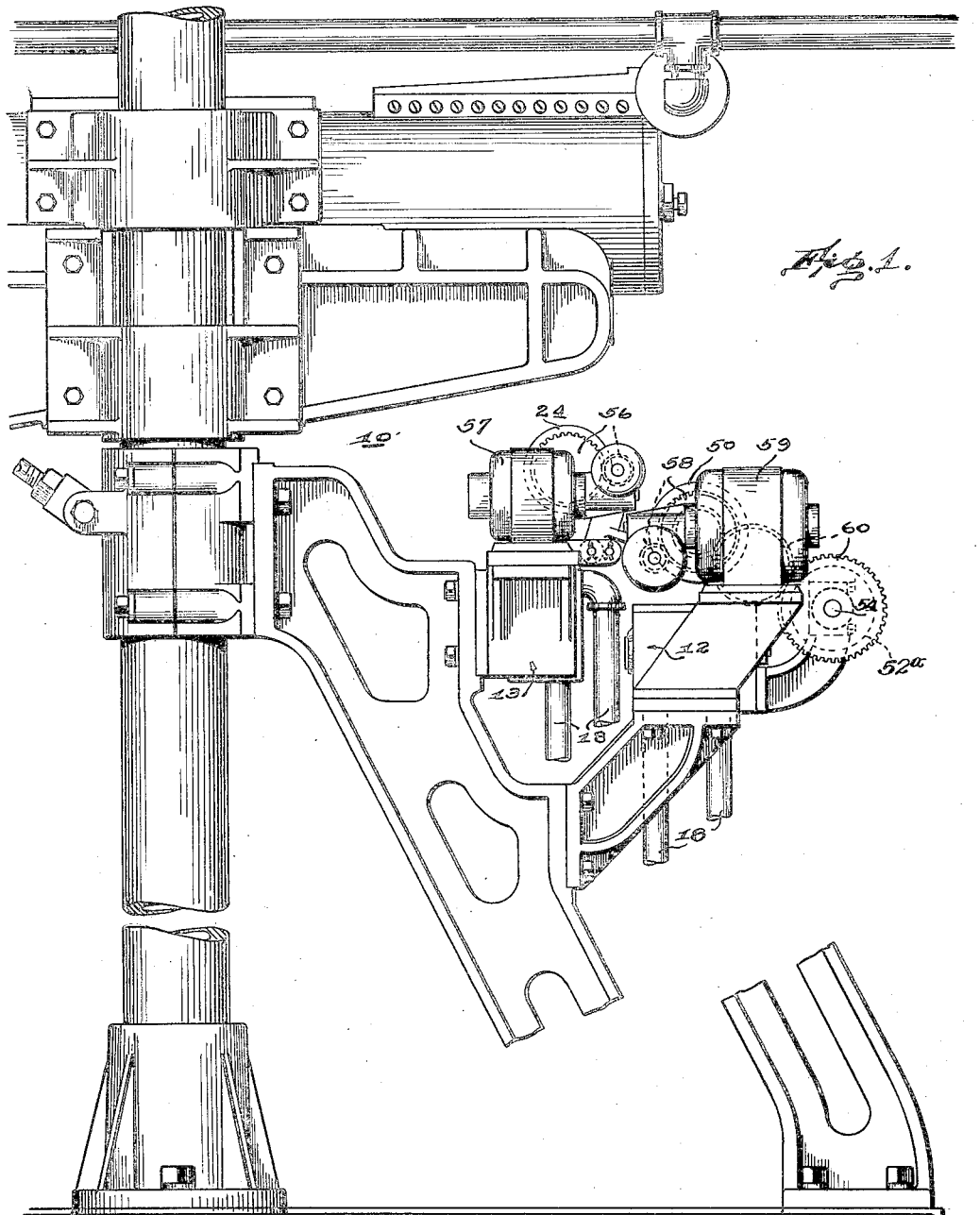

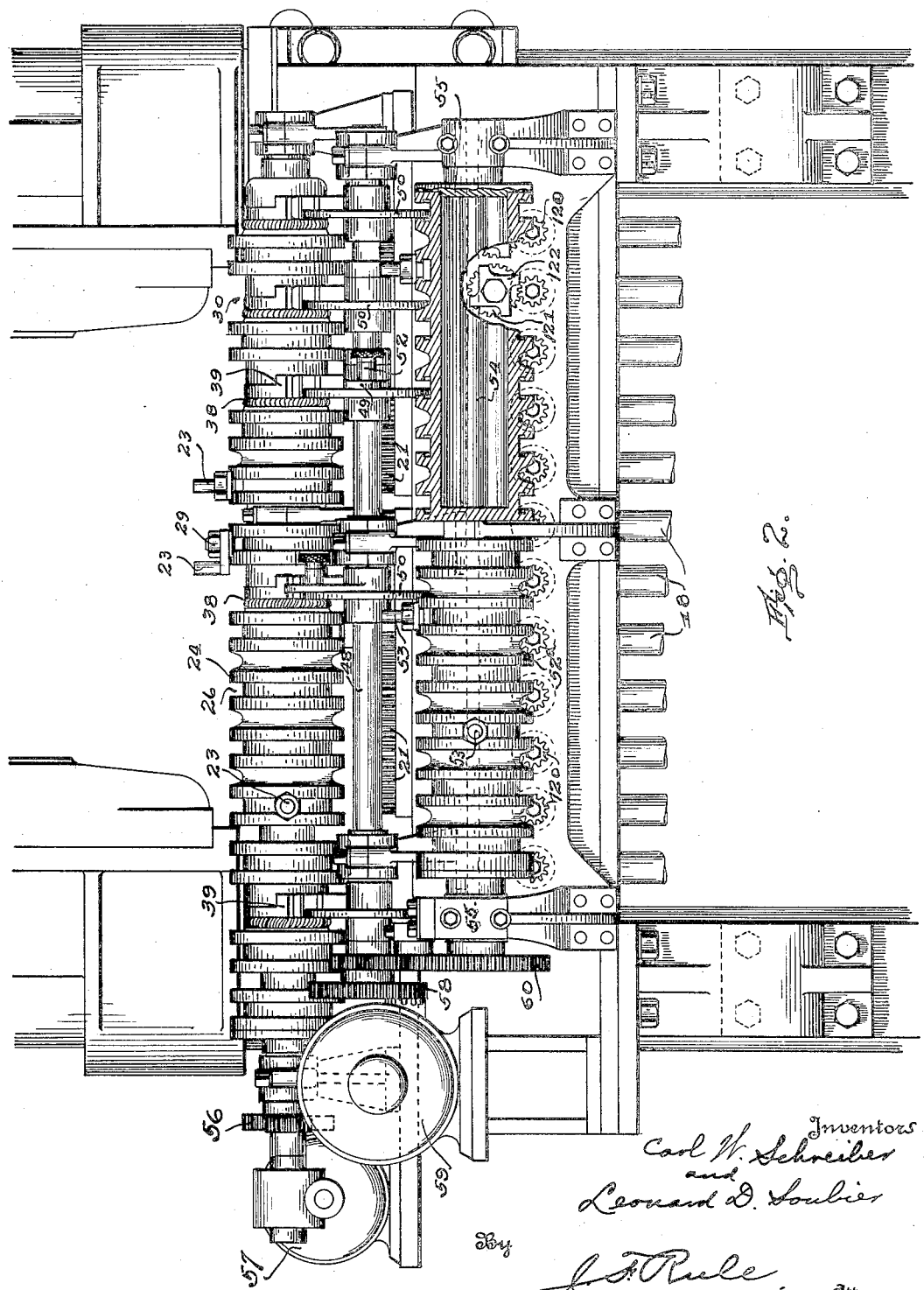

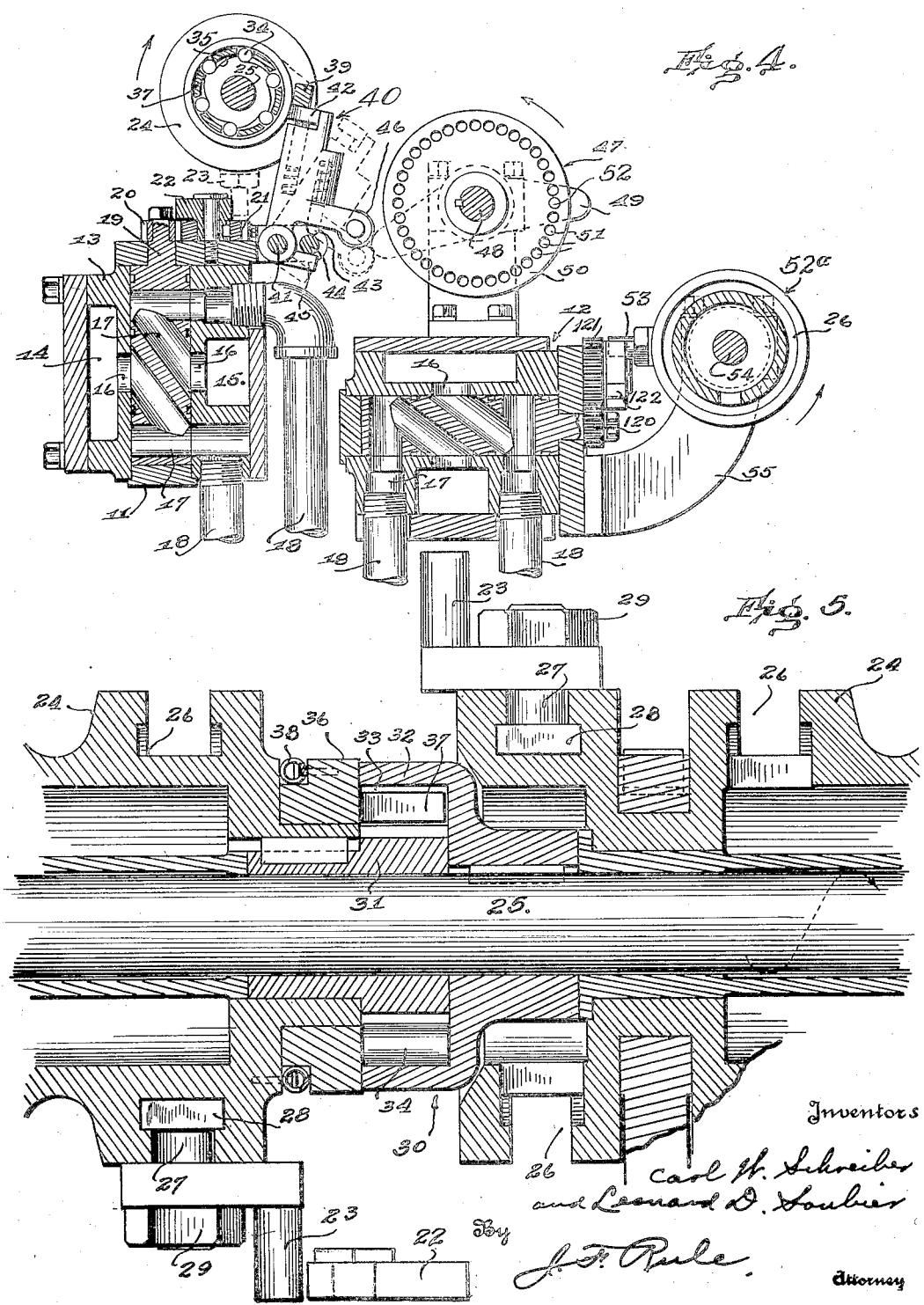

Oct. 22, 1935.  C. W. SCHREIBER ET AL  2,017,992
TIMER
Filed Sept. 14, 1933  5 Sheets-Sheet 5
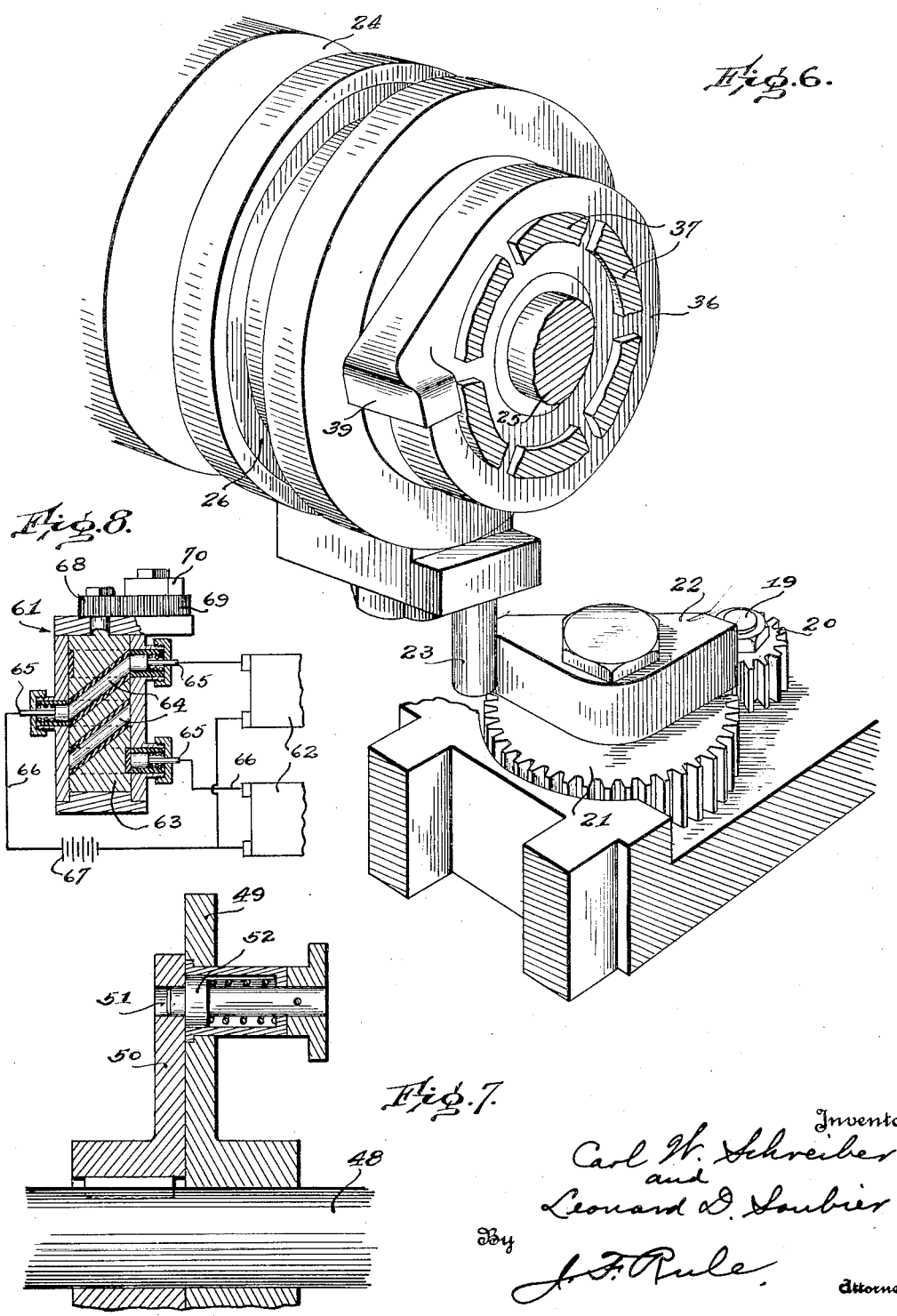
Inventors
Carl W. Schreiber
and
Leonard D. Soubier
By
J. F. Rule
Attorney Patented Oct. 22, 1935

2,017,992

UNITED STATES PATENT OFFICE 2,017,992

TIMER

Carl W. Schreiber, Alton, Ill., and Leonard D. Soubier, Toledo, Ohio, assignors to Owens-Illinois Glass Company, a corporation of Ohio Application September 14, 1933, Serial No. 689,490

11 Claims. (Cl. 161—7)

The present invention relates to improvements in timers and more particularly to mechanism for regulably controlling a series of operations involved in the production of an article of merchandise such for example as a glass bottle or jar.

An object of the invention is the provision of a novel form of timer by means of which groups of operations as well as individual operations may be relatively adjusted.

Other objects will be in part apparent and in part pointed out hereinafter.

In the drawings:

Fig. 1 is an end elevational view of the timer mounted upon one end of a bottle blowing machine.

Fig. 2 is a side elevational view thereof with parts broken away and shown in section.

Fig. 3 is a top plan view thereof.

Fig. 4 is a sectional view taken substantially along the line IV—IV of Fig. 3.

Fig. 5 is a detail sectional view showing adjacent ends of two drums and the clutch for one drum.

Fig. 6 is a detail perspective view with parts in section.

Fig. 7 is a detail sectional view showing an adjustable trip device.

Fig. 8 is a view illustrating a rotary electric switch with which the timer may well be employed.

While the form of timer herein illustrated is particularly adaptable for use in connection with a bottle blowing machine as illustrated (but not claimed) in a copending application, Serial Number 663,721, filed March 31, 1933, in the name of Leonard D. Soubier, now Patent Number 1,977,742, dated October 23, 1934, it may well be employed in regulably controlling the operations of other types of machines as will be apparent hereinafter.

In the present application the timer is shown associated with a series of rotary valves which regulate and control the supply of air under pressure and/or vacuum to piston motors or the like (not shown). It may also operate with rotary electric switches (Fig. 8) which are employed in place of the valves for controlling the operation of motors, solenoids, etc.

In the operation of a bottle blowing machine of conventional form, there are certain operations which may be grouped together and seldom require any relative adjustment. In other words the timed relation between certain operations may be practically fixed even though the machine is employed in the production of a comparatively wide range of sizes and shapes of bottles. While the operations of a given group may not require relative adjustment, it is frequently and, in fact, generally necessary when changing the machine for the production of another size of bottle to advance or retard certain of the groups of operations with respect to others. The specific form of timer shown is adapted to regulate and control the operation of a machine including a single blank forming unit and two finishing molds. Accordingly the timer functions to cause two complete cycles of operations of the blank forming unit to one operation of each of the two finishing molds. This same general principle obviously is applicable to certain other types of machines.

The illustrated embodiment of the invention is shown mounted upon one end of a bottle forming machine 10 and directly associated with a battery of vertical rotary valves 11 and a battery of horizontal rotary valves 12. The valves 11 are suitably grouped as may be required by the cycle of operations of the particular machine with which they are associated and are mounted in a housing 13 including a supply chamber 14 and an exhaust chamber 15. The adjacent walls of these chambers 14 and 15 are provided with horizontally aligned ports 16 which cooperate with passageways 17 in the valves 11 in supplying air to and exhausting it from a piston motor (not shown). Pipes 18 connect the valve and motor. The upper end of each of the vertical valves 11 is formed with an axial extension 19 which carries a pinion 20 meshing with a gear 21, the latter operatively connected to a star wheel 22. This star wheel when of a form including four lobes is arranged in the path of rotation of a single finger 23 which rotates at regular time intervals with a horizontal drum 24. Incidentally if the valve is to be opened and closed in less than the time required for one complete revolution of the corresponding drum, the star wheel will include only two lobes. And two fingers 23 (Fig. 5) will be employed to actuate the star wheel. One finger is mounted at the inner end of one of a pair of adjacent drums for moving the star wheel in one direction and the other finger is carried at the inner end of the other drum for the purpose of moving the star wheel in the reverse direction, the fingers being spaced apart circumferentially to provide the necessary time interval between opening and closing of the valve. The drum which may carry any number of fingers 23 is mounted upon a continuously rotating horizontal shaft 25. As will be observed in the drawings, there may be a number of these drums, the number depending entirely upon the particular grouping of the various operations.

Each drum 24 is formed with the necessary number of peripheral undercut grooves 26 in which the fingers 23 may be secured in any preferred manner. Obviously these fingers may be adjusted circumferentially of the grooves 26 in order that the fingers making up any given group may be properly positioned relative to each other and actuate valves in a predetermined sequence. To this end each finger is connected to the drum by a bolt 27 having a head 28 fitted into the undercut groove 26, and a nut 29 for securing the finger at any adjusted point.

These finger carrying drums are mounted to allow relative rotation between them and the shaft 25 and rotate with said shaft at regular time intervals through the action of a roller clutch 30. The specific construction of the clutch involved includes circumferentially shiftable inner and outer clutch members 31 and 32, the inner member being keyed to one end of the drum while the outer member is suitably connected to the shaft 25. The adjacent ends of these clutch members are spaced apart radially providing an annular chamber 33 to accommodate an annular series of clutch rollers 34. Normally these rollers occupy a position at the lower end of a series of inclined cam surfaces 35 on the periphery of the inner member 31. A roller shifter 36 including an annular series of spacing fingers 37 overlying the cam surfaces 35 between the clutch rollers 34, operates to move the rollers toward the upper ends of said cam surfaces for the purpose of effecting operative connection between the inner and outer clutch members and thereby causing rotation of the drum with the shaft. A coil spring 38 secured at one end to the shifter 36 and at its other end to the drum 24, exerts a constant pull on the shifter tending to operatively position the clutch rollers as just stated. Automatically releasable stops function to oppose such operation of the spring 38 during predetermined periods of time and thereby hold the drum against rotation. Each stop consists of a radial finger 39 or tooth carried by the shifter 36 and a pawl 40 mounted on the valve housing 13 and normally projecting into the path of travel of said finger and holding the latter together with the drum against rotation. This pawl consists of a substantially L-shaped body pivoted to a horizontal hinge pin 41. A yieldingly mounted plunger 42 is adapted to engage the finger 39. Means including a spring pressed plunger 43 and a stationary stop 44 normally holds the pawl in operative position. A finger 45 carried by the pawl engages said stop 44 for limiting swinging movement of the pawl in one direction. A roller 46 is adapted to be engaged by a trip device 47 preparatory to rotation of the drum and fingers carried thereby. This trip device includes a continuously rotating horizontal shaft 48 extending parallel with the drum shaft 25, and radial trip arms 49 individual to the pawls 40 and drums 24 mounted upon said shaft 48. Each trip arm is associated with a disk 50 which is keyed to the shaft 48 and provided with an annular series of apertures 51, the latter designed to cooperate with a spring pressed detent 52 in securing the trip arm in any adjusted position. The detent 52, which is carried by the arm 49, is manually releasable and serves to effectively secure the arm and disk together. For the purpose of regulably controlling the operations of the finishing molds (not shown) the battery of valves 12 (referred to heretofore) is provided. With these valves are associated two rotary drums 52ª individual to the finishing molds and carrying radial fingers 53, one for each valve 12. Each valve is connected to a pinion 120 which meshes with a gear 121, the latter carrying a star wheel 122 provided with four lobes. One of these lobes is at all times disposed in the path of travel of one of the fingers 53. These drums 52ª which rotate together are mounted upon a continuously rotating horizontal shaft 54. This shaft is journaled in bearings 55 and in the present disclosure rotates at one-half the speed of the shaft 25 carrying the drums 24 forming part of the regulating means for the blank mold unit.

All of the shafts are motor driven, the upper shaft 25 being connected through gears 56 to an electric motor 57. The trip arm shaft 48 is connected through gears 58 to a variable speed motor 59 and by means of a train of gears 60 imparts motion to the shaft 54 upon which the finishing mold drums are mounted.

*Operation*

It will be understood that the trip arms 49 are disposed at different angles as may be required by the timing of the machine operations. Constant rotation of the shaft 48 effects operative engagement between the arms 49 and pawls 40 in a predetermined variable order. As a result the clutches 30 are brought into operation in an orderly fashion and cause periodic opening and closing of the valves 11 singly in succession or in groups as may be necessary. The manner in which the clutches and pawls regulate and control the drum rotation has been fully set out in the foregoing. The star wheels, as is apparent, are rotated through an angle of 90° upon each engagement with the fingers on the drum 24 and through the pinions 20 and gears 21 impart 180° of rotation to the corresponding valves. The fingers 53 on the other drums 52ª operate in a similar fashion through the pinions 120 and gears 121 to actuate the valves 12.

In Fig. 8 there is illustrated a rotary electric switch 61 of which there may well be a battery for regulating the operation of solenoids 62, electric motors, etc. This switch includes a rotary member 63 provided with a pair of diagonal conductor bars 64 extending through opposed faces of said member. Terminals 65 in the housing are connected through wires 66 to a source of electric energy 67 and the solenoids 62. The rotary member carries a pinion 68 at its upper end intended for operative connection to a gear 69 and star wheel 70. The star wheel is actuated as pointed out above in connection with the valves.

Modifications may be resorted to within the spirit and scope of the appended claims.

What we claim is:

1. In a timer, a continuously rotating shaft, a plurality of drums rotatively supported on the shaft, radial fingers carried by said drums, means for operatively connecting the drums and shaft at regular time intervals including roller clutches individual to the drums, means normally holding the clutch rollers inoperative, and mechanism operating said holding means to effect movement of the clutch rollers in a predetermined order and thereby effect driving connection between said drums and shaft.

2. In a timer, a continuously rotating shaft, a plurality of drums rotatively supported on the shaft, valve operating fingers carried by said drums, means for operatively connecting the drums and shaft at regular time intervals including clutches individual to the drums, means normally holding the clutches inoperative, mechanism operating said holding means to release the clutches in a predetermined order and thereby effect driving connection between said drums and shaft, each clutch holding means including a radial finger forming a part of the clutch, and a pawl mounted at one side of the clutch and normally disposed in the path of travel of said radial finger.

3. In a timer, a continuously rotating shaft, a plurality of drums rotatively supported on the shaft, valve operating fingers carried by said drums, means for operatively connecting the drums and shaft at regular time intervals including clutches individual to the drums, means normally holding the clutches inoperative, mechanism operating said holding means to release the clutches in a predetermined order and thereby effect driving connection between said drums and shaft, each clutch holding means including a radial finger forming a part of the clutch, a pawl mounted at one side of the clutch and normally disposed in the path of travel of said radial finger, and a plurality of continuously moving trip arms individual to said pawls and operating to move the latter out of engagement with the fingers in a predetermined order, each of said pawls extending into the path of travel of one of the trip arms.

4. In a timer, a continuously rotating shaft, a plurality of drums rotatively supported on the shaft, valve operating fingers carried by said drums, means for operatively connecting the drums and shaft at regular time intervals including clutches individual to the drums, means normally holding the clutches inoperative, mechanism operating said holding means to release the clutches in a predetermined order and thereby effect driving connection between said drums and shaft, each clutch holding means including a radial finger forming a part of the clutch, a pawl mounted at one side of the clutch and normally disposed in the path of travel of said radial finger, a plurality of continuously moving trip arms individual to said pawls and operating to move the latter out of engagement with the fingers in a predetermined order, each of said pawls extending into the path of travel of one of the trip arms, and means for shifting the trip arms about their axis of rotation relative to each other to thereby change the timed relation between the drum operations.

5. A timer comprising a pair of continuously rotating shafts arranged side by side, a plurality of drums rotatively supported on one shaft, said drums arranged in groups, valve operating devices on each drum, a clutch for each drum adapted to operatively connect it to the corresponding shaft periodically, trip devices individual to the clutches and including radial fingers carried by and rotating with the other shaft, and means normally holding the clutches inoperative and actuated at regular time intervals by the rotating fingers for placing the clutches in operation in a predetermined order.

6. A timer comprising a continuously rotating shaft, a drum mounted on the shaft, a valve operating device on the drum, a roller clutch including a clutch member attached to said shaft for rotation therewith, a clutch member attached to one end of the drum, clutch rollers between and shiftable circumferentially of said members to operative and inoperative positions, a shifter for the rollers, a spring normally tending to actuate the shifter and thereby move the rollers to their operative position, and releasable means for holding the shifter against movement under influence of the spring.

7. A timer comprising a continuously rotating shaft, a drum mounted on the shaft, a valve operating device on the drum, a roller clutch including a clutch member attached to said shaft for rotation therewith, a clutch member attached to one end of the drum, clutch rollers arranged between said members and shiftable about said shaft to operative and inoperative positions, a shifter for the rollers, a spring normally tending to actuate the shifter and thereby move the rollers to their operative position, a stop device normally holding the shifter against movement under influence of said spring, and automatic means for operating the stop device periodically to release the shifter for movement by means of said spring.

8. A timer comprising a continuously rotating shaft, a drum mounted on the shaft, a valve operating device on the drum, a roller clutch including a clutch member attached to said shaft for rotation therewith, a clutch member attached to one end of the drum, clutch rollers arranged between said members and shiftable about said shaft to operative and inoperative positions, a shifter for the rollers, a spring normally tending to actuate the shifter and thereby move the rollers to their operative position, a stop device, means normally positioning said stop device to hold the shifter against movement under influence of the spring, a finger extending radially outward from said shifter, a pawl normally projecting into the path of movement of the finger, and automatic means for moving said pawl out of the path of travel of the finger at regular time intervals.

9. A timer comprising a continuously rotating shaft, a drum mounted upon the shaft, a roller clutch including a clutch member attached to said shaft in proximity to one end of the drum, a clutch member at the adjacent end of the drum, rollers arranged between said clutch members, a roller shifter operable for moving the rollers about said shaft to operative and inoperative positions, a spring tending to move the shifter in one direction, and a releasable stop normally holding the shifter against movement under influence of said spring.

10. A timer comprising a pair of continuously rotating shafts arranged side by side in parallel relation, a drum mounted on one shaft, a valve operating device on the drum, a roller clutch including a clutch member attached to said one shaft in proximity to one end of the drum, a clutch member attached to the adjacent end of said drum, rollers arranged between said clutch members and shiftable about the shaft to operative and inoperative positions, a shifter for the rollers, a spring normally tending to move the shifter about the shaft and thereby place the rollers in operative position, a pawl normally opposing such movement of the shifter under influence of the spring, and a trip device for inoperatively positioning the pawl at regular time intervals, said trip device comprising a finger extending radially from the other shaft and rotating therewith in a path into which a portion of said pawl projects.

11. A timer comprising a pair of continuously rotating shafts arranged side by side in parallel relation, a drum mounted on one shaft, a valve operating device on the drum, a roller clutch including a clutch member attached to said one shaft in proximity to one end of the drum, a clutch member attached to the adjacent end of said drum, rollers arranged between said clutch members and shiftable about the shaft to operative and inoperative positions, a shifter for the rollers, a spring normally tending to move the shifter about the shaft and thereby place the rollers in operative position, a pawl normally opposing such movement of the shifter under influence of the spring, a trip device for inoperatively positioning the pawl at regular time intervals, said trip device including a finger extending radially from the other shaft and journaled for independent rotary movement thereon, a disk attached to said other shaft, and releasable means for securing said finger to the disk for rotation therewith, said finger moving in a path into which a portion of said pawl projects.

CARL W. SCHREIBER.
LEONARD D. SOUBIER.